(12) United States Patent
Guretzky et al.

(10) Patent No.: US 10,727,575 B2
(45) Date of Patent: Jul. 28, 2020

(54) RADOME

(71) Applicant: NANOGATE SE, Quierschied-Göttelborn (DE)

(72) Inventors: Mirko Guretzky, Bad Salzuflen (DE); Matthias Kästner, Porta Westfalica (DE); Jan Wisomiersky, Detmold (DE); Norbert Weiss, Aichach (DE)

(73) Assignee: NANOGATE SE, Quierschied-Göttelborn (DE)

( * ) Notice: Subject to any disclaimer, the term of this patent is extended or adjusted under 35 U.S.C. 154(b) by 0 days.

(21) Appl. No.: 15/758,180

(22) PCT Filed: Sep. 6, 2016

(86) PCT No.: PCT/EP2016/070930
§ 371 (c)(1),
(2) Date: Mar. 7, 2018

(87) PCT Pub. No.: WO2017/045968
PCT Pub. Date: Mar. 23, 2017

(65) Prior Publication Data
US 2018/0254551 A1 Sep. 6, 2018

(30) Foreign Application Priority Data
Sep. 16, 2015 (DE) .......... 10 2015 217 744

(51) Int. Cl.
*H01Q 1/42* (2006.01)
*B60R 13/00* (2006.01)
*H01Q 1/32* (2006.01)

(52) U.S. Cl.
CPC .......... *H01Q 1/422* (2013.01); *B60R 13/005* (2013.01); *H01Q 1/32* (2013.01)

(58) Field of Classification Search
CPC .......... H01Q 1/422; H01Q 1/32; G01S 7/032; G01S 2013/9375; B60R 13/005
See application file for complete search history.

(56) References Cited

U.S. PATENT DOCUMENTS 3,082,510 A * 3/1963 Kelly ............... H01Q 1/425
156/183
4,241,129 A * 12/1980 Marton ............ B32B 15/08
428/216
(Continued)

FOREIGN PATENT DOCUMENTS

DE 198 44 021 C2 5/2001
DE 10 44 971 A1 4/2002
(Continued)

OTHER PUBLICATIONS

International Search Report for International Application No. PCT/EP2016/070930 dated Dec. 6, 2016.
(Continued)

*Primary Examiner* — Daniel Munoz
*Assistant Examiner* — Bamidele A Jegede
(74) *Attorney, Agent, or Firm* — Clements Bernard Walker

(57) ABSTRACT

The invention relates to a radome for a distance warning radar on a motor vehicle, comprising a design element, e.g. a logo, which is visible from the outside and is integrated into the radome, as well as to a method for manufacturing said radome.

10 Claims, 1 Drawing Sheet

(56) References Cited

U.S. PATENT DOCUMENTS

| | | | | |
|---|---|---|---|---|
| 5,283,592 | A * | 2/1994 | Bogorad | B64G 1/54 343/872 |
| 5,408,244 | A * | 4/1995 | Mackenzie | H01Q 1/422 343/872 |
| 5,672,397 | A * | 9/1997 | Bowers, Jr. | B29C 45/14811 428/16 |
| 5,844,523 | A * | 12/1998 | Brennan | H01Q 1/2225 343/700 MS |
| 6,093,278 | A * | 7/2000 | Wade | B32B 3/08 156/292 |
| 6,184,842 | B1 * | 2/2001 | Leinweber | B29C 45/16 156/60 |
| 6,328,358 | B1 * | 12/2001 | Berweiler | B60R 19/52 180/68.6 |
| 6,433,753 | B1 * | 8/2002 | Zimmermann | H01Q 1/02 343/872 |
| 2002/0044101 | A1 * | 4/2002 | Zimmermann | H01Q 1/02 343/872 |
| 2002/0048667 | A1 * | 4/2002 | Kauppi | B29C 45/14688 428/209 |
| 2002/0071940 | A1 * | 6/2002 | Arnold | H05K 9/003 428/195.1 |
| 2003/0052810 | A1 * | 3/2003 | Artis | G01S 7/03 342/1 |
| 2003/0077463 | A1 * | 4/2003 | Ishikawa | B29C 45/14811 428/458 |
| 2004/0219366 | A1 * | 11/2004 | Johnson | B32B 27/08 428/423.1 |
| 2005/0223537 | A1 * | 10/2005 | Hamilton | B44C 3/085 29/527.4 |
| 2005/0237261 | A1 * | 10/2005 | Fujii | H01Q 1/40 343/872 |
| 2006/0083015 | A1 * | 4/2006 | Yamazaki | B60R 13/00 362/540 |
| 2006/0216442 | A1 * | 9/2006 | Kamiya | H01Q 1/3233 428/31 |
| 2007/0104897 | A1 * | 5/2007 | Oba | B60R 13/00 428/31 |
| 2007/0109206 | A1 * | 5/2007 | Fujii | H01Q 1/44 343/711 |
| 2007/0228604 | A1 * | 10/2007 | Lee | B29C 59/00 264/271.1 |
| 2008/0233367 | A1 * | 9/2008 | Maeda | H01Q 1/3233 428/201 |
| 2008/0309579 | A1 * | 12/2008 | Maeda | H01Q 1/42 343/872 |
| 2008/0311431 | A1 * | 12/2008 | Fuji | G11B 5/3903 428/836 |
| 2009/0225561 | A1 * | 9/2009 | Kleber | B60R 13/00 362/485 |
| 2009/0251375 | A1 * | 10/2009 | Margomenos | H01Q 1/32 343/786 |
| 2010/0293824 | A1 * | 11/2010 | Weigand | B60R 13/005 40/299.01 |
| 2011/0047784 | A1 * | 3/2011 | Ohtake | G01S 7/03 29/600 |
| 2011/0088827 | A1 * | 4/2011 | Zanini | B60R 13/005 156/63 |
| 2011/0123731 | A1 * | 5/2011 | Zanini | B44C 5/00 428/31 |
| 2011/0236672 | A1 * | 9/2011 | Yanagimoto | B05D 5/00 428/323 |
| 2012/0038518 | A1 * | 2/2012 | Wu | H01Q 1/243 343/702 |
| 2012/0076960 | A1 * | 3/2012 | Greve | B60R 13/005 428/31 |
| 2012/0119961 | A1 * | 5/2012 | Mayer Pujadas | H01Q 1/38 343/713 |
| 2012/0182722 | A1 * | 7/2012 | Wu | F21S 43/26 362/157 |
| 2014/0062114 | A1 * | 3/2014 | Gaboury | B60R 13/005 296/1.08 |
| 2014/0093665 | A1 * | 4/2014 | Horibe | H01Q 1/3233 428/31 |
| 2014/0218263 | A1 * | 8/2014 | Burdenski | H01Q 1/32 343/872 |
| 2015/0004423 | A1 * | 1/2015 | Cheon | C08J 5/24 428/521 |
| 2015/0076851 | A1 * | 3/2015 | Sugiura | B60R 13/04 296/1.08 |
| 2015/0086731 | A1 * | 3/2015 | Sugiura | B32B 37/18 428/31 |
| 2015/0140259 | A1 * | 5/2015 | Sugiura | B60R 13/005 428/72 |
| 2016/0261034 | A1 * | 9/2016 | Geise | B29C 45/14434 |

FOREIGN PATENT DOCUMENTS

| | | | | |
|---|---|---|---|---|
| DE | 10 2006 046 436 B3 | 4/2008 | | |
| DE | 10 2006 052 303 A1 | 5/2008 | | |
| DE | 10 2007 059 758 A1 | 6/2009 | | |
| DE | 10 2012 018 328 A1 | 3/2014 | | |
| DE | 102012018328 A1 * | 3/2014 | | H01Q 1/422 |
| EP | 1317781 A1 * | 6/2003 | | H01Q 1/02 |
| EP | 1812989 A1 * | 8/2007 | | B29C 45/16 |
| EP | 1902902 A1 * | 3/2008 | | B29C 45/1671 |
| EP | 0 954 052 B1 | 12/2008 | | |
| EP | 2 177 575 A1 | 4/2010 | | |
| EP | 2862690 A1 * | 4/2015 | | B29C 45/14311 |
| JP | 2008024254 A | 2/2008 | | |

OTHER PUBLICATIONS

Kunststoff, Von,,https://de.wikipedia.org/w/Index.php?title=Kunststoff&oldid=144885934.

\* cited by examiner

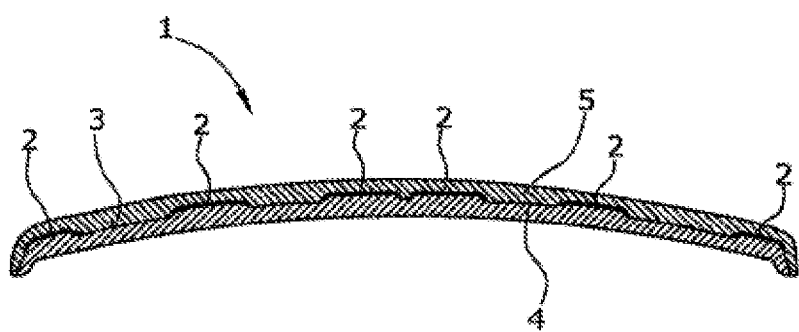

RADOME

FIELD OF THE INVENTION

The invention relates to a radome for a radar distance warning system of a motor vehicle with a design element, such as a logo, which is visible from the outside and integrated in the radome, and to a process for its preparation.

BACKGROUND OF THE INVENTION

The radar-permeable member is mounted in the beam path of a radar radiator installed on a motor vehicle. This radome protects the radar emitter from environmental influences and at the same time covers the required open beam path with a defined geometry adapted to the wavelength range. It therefore ensures integration of the radar reflector into the homogeneous appearance of the vehicle without affecting its function. The radome can be embodied in the form of a design element and thus can contribute to the direct identification and characteristics of the vehicle.

DE 198 44 021 C2 describes a covering part made of plastic lying within the beam path of a radar device and having partial areas of metal visible from the outside, in which
the plastic part has a multilayer structure,
partial areas of metal are formed by an extremely thin layer vapor-deposited onto one of the layers which acts as a support,
said partial areas of metal are covered with, or vapor-deposited on, a transparent layer towards the surface side from which they are supposed to appear visible from the outside,
the metal layer is applied on the whole surface in the total area to be penetrated by the radar beams, and is covered by an opaque layer in those areas where it should not be visible from the outside,
characterized in that the metal layer is made of indium and has a thickness in the nanometer range.

JP 2008-24 254 A describes a structure and a method of manufacturing a radome for a motor vehicle distance warning radar. The radome described therein consists of a support, a design element and a surface layer. The design element is integrated in the support made of dark plastic, and provided with a thin, radar transparent, shiny metal layer. The surface layer is made of transparent plastic, which covers both the design element and the support.

The manufacturing method according to EP 0954052 B2 is very expensive. The design element is embedded into a negative mold in a radar and visually transparent cover plate, wherein said mold is provided with a metallic coating or a coating having a metallic shine, and said metallic coating or coating having a metallic shine has such a thickness that the electromagnetic radiation is reflected completely in the visible wavelength range, and the longer-wave radar waves pass through almost unhindered.

The known coverings/facings of distance warning systems are prepared by joining technology. In this method, air bubbles must be avoided (see EP 0954052 B1, [0012]) to ensure trouble-free radar passage. This leads to high cost, in addition, the visually transparent surface of the component must be coated with a hard coat in order to provide scratch protection, chemical and UV resistance. This coating also causes considerable costs.

BRIEF SUMMARY OF THE INVENTION

The object of the present invention is to provide an improved radome for a distance warning system of a motor vehicle with a design element visible from the outside and integrated in the radome, and an improved method for its preparation.

BRIEF DESCRIPTION OF THE DRAWINGS

The present invention is illustrated and described herein with reference to the drawing, in which like reference numbers denote like method steps and/or system components, respectively, and in which:

FIG. 1 is a radome in accordance with the present invention.

DETAILED DESCRIPTION OF THE INVENTION

In a first embodiment of the present invention, the above object is achieved by a radome 1 for radar frequencies of a distance warning system of a motor vehicle with an integrated design element 2 visible from the outside on the surface 3 of a thermoplastic or thermoset support 4 with a three-dimensional appearance of the design element 2 on the surface of the support 4 and a visually transparent coating 5 on the exposed surface of the design element 2 and the surface 3 of the support 4 that surrounds the design element 2.

The radome 1 according to the invention has a simple resource-saving construction in which the design element 2 is completely embedded in the component. The design element 2 may have integrated, for example, a company logo or a characteristic structure of a motor vehicle, while it has full radar transparency without affecting the propagation of the radar waves by diffraction, refraction, scattering and reflection, wherein the imaging properties of the radome 1 are fully retained. In this case, the radome 1 can also have the form and function of a lens.

The radome 1 thus consists of a radar-transparent, visually non-transparent support 4, which has, in particular, a dark color (for example, black), is opaque or coated accordingly. On the surface 3 of the support 4 that is facing away from the beam path of the radar-source, the design element 2 is in direct surface contact with the support 4, provided that its surface 3 is not provided with a functional coating prior to the application of the design element. The thus exposed surface of the design element 2 that is visible from the outside and the thus exposed surface 3 of the support 4 are provided with a visually transparent coating 5.

In a preferred embodiment of the present invention, the design element 2 is metallic or has a metallic shine. This layer can be applied, for example, by a per se known PVD method and is preferably kept so thin that the electromagnetic radiation in the visible wavelength range, or the light, is substantially completely reflected to the viewer from the outside, but the longer-wave radar waves pass in the opposite direction virtually unimpeded. The thickness of a thin layer of the design element 2 can be determined experimentally for different coating materials. It is for example a few nanometers to micrometers.

According to the present invention, it is particularly preferred for the design element 2 to comprise at least one metallic layer comprising gold, silver, indium, chromium, aluminum, copper, stainless steel, silicon and/or titanium. Alternatively or in addition thereto, the radome 1 can also comprise at least one paint coat, especially in the exterior color of the motor vehicle.

The support 4 of the radome 1 can be produced in any desired manner according to per se known methods. For thermoplastic supports 4, injection molding suggests itself, especially in order to be able to reproduce a three-dimensional impression of the design element 2 on its surface 3. For this purpose, thermoplastic materials used in the prior art can be employed, wherein the support 4, which optionally has been injection molded, contains, in particular, polyurethane (PUR), polycarbonate (PC), polymethyl methacrylate (PMMA), and/or acrylonitrile-butadiene-styrene (ABS).

The visually transparent coating 5 may comprise a wide variety of materials, and be applied by a wide variety of methods. Plastic coatings are very suitable for the purposes of the present invention because of the visual transparency they usually have. What is of importance here is the weather resistance if this coating is directly exposed to the environment in a vehicle. For example, commercially available scratch-resistant coatings of siloxanes, which can be easily applied, are particularly preferred according to the present invention (see for example EP 2177575 A1). Alternatively, the coating 5 can also comprise less resistant coatings but of simpler polymers. In a preferred embodiment, the coating comprises known thermoplasts or thermosetting plastics, such as preferably a visually transparent coating 5 made of polyurethane or polycarbonate, as this can be applied in various ways to the exposed surface of the design element 2 and the exposed surface 3 of the support 4. Optionally the coating 5 can be provided with a further coating (not shown in the FIGURE), if necessary. To protect the radome surface against mechanical or chemical influences, this coating can be applied, for example, by means of chemical vapor deposition (CVD), and may be a visually transparent and radar-transparent vitreous layer having a thickness of only a few micrometers that may contain $SiO_2$. It is known that scratch-resistant radar-transparent coatings may also be applied by spray painting or sol gel techniques. This further coating may be provided, in particular, when the weathering properties of the coating 5 are not sufficient. For example, the scratch-resistant coatings described above are suitable here.

A further embodiment of the present invention relates to a process for the production of a radome 1 as defined above, which is characterized by
   producing the support 4 in a first step,
   applying the design element 2 to the surface of the support 4 in a second step, and
   applying the transparent layer 5 to the exposed surface 3 of the design element 2 and to the surface of the support 4 that surrounds the design element 2, in a third step.

The process is particularly characterized by its simplicity compared with the known prior art processes.

It is particularly preferred according to the present invention to prepare the support 4 by injection molding. Here, a surface-accurate representation of the design element 2 is possible.

The design element 2 can be applied, for example, by metallization, physical vapor deposition (PVD) or printing processes, in particular, tampon printing, digital printing, inkjet printing, laser printing, transfer printing or screen printing.

According to the present invention, it is particularly preferred to apply the transparent coating 5 by spraying, flow coating or dipping. This procedure is particularly appropriate when the transparent coating 5 is applied with the use of polyurethane.

Despite the three manufacturing steps, the component is ultimately integral and not a part to be joined. Air pockets are thus excluded.

The invention claimed is:

1. A process for the production of a radome comprising: providing an integrated design element visible from the outside on a surface of a thermoplastic or thermoset support with a three-dimensional appearance of the design element on the surface of the support and a visually transparent coating on an exposed surface of the design element and the surface of the support that surrounds the design element, the support contains a dimple that defines a midpoint of the radome and separates a left side from a right side;
   producing the support in a first step by injection molding;
   applying the design element to local areas of the surface of the support forming protrusions and recesses when the radome is viewed from the side, in a second step; and
   applying the transparent coating to the surface of the design element and to the surface of the support that surrounds the design element, in a third step.

2. The process according to claim 1, characterized in that said design element is applied by metallization, physical vapor deposition (PVD) or printing processes.

3. The process according to claim 1, characterized in that the transparent coating is applied by spraying, flow coating or dipping.

4. The process according to claim 1, wherein the design element is composed of silicon or indium.

5. The process according to claim 1, wherein the design element has a thickness of a few nanometers to micrometers.

6. A process for the production of a radome comprising: providing an integrated design element visible from the outside on a surface of a thermoplastic or thermoset support with a three-dimensional appearance of the design element on the surface of the support, the design element is positioned on local areas on the surface of the support forming protrusions and recesses when the radome is viewed from the side, and a visually transparent coating on an exposed surface of the design element and the surface of the support that surrounds the design element, the support contains a dimple that defines a midpoint of the radome and separates a left side from a right side of the radome, wherein the protrusions and recesses formed by the design element positioned on the surface of the support of the left side mirrors the protrusions and recesses formed by the design element positioned on the surface of the support of the left side of the radome;
   producing the support in a first step;
   applying the design element to local areas of the surface of the support forming protrusions and recesses when the radome is viewed from the side, in a second step; and
   applying the transparent coating to the surface of the design element and to the surface of the support that surrounds the design element, in a third step.

7. The process according to claim 6, characterized in that said design element is applied by metallization, physical vapor deposition (PVD) or printing processes.

8. The process according to claim 6, characterized in that the transparent coating is applied by spraying, flow coating or dipping.

9. The process according to claim 6, wherein the design element is composed of silicon or indium.

10. The process according to claim 6, wherein the design element has a thickness of a few nanometers to micrometers.

* * * * *